United States Patent [19]
Minden et al.

[11] Patent Number: 5,790,722
[45] Date of Patent: Aug. 4, 1998

[54] HIGH POWER OPTICAL FIBER AMPLIFIER/LASER SYSTEM

[75] Inventors: Monica L. Minden; Hans Bruesselbach, both of Calabasas, Calif.

[73] Assignee: Hughes Electronics, Los Angeles, Calif.

[21] Appl. No.: 632,861

[22] Filed: Apr. 16, 1996

[51] Int. Cl.$^6$ ............................................. G02B 6/26
[52] U.S. Cl. ........................ 385/27; 359/341; 372/6
[58] Field of Search .......................... 359/341; 372/6; 385/15, 27, 39

[56] References Cited

U.S. PATENT DOCUMENTS

| | | | |
|---|---|---|---|
| 5,305,335 | 4/1994 | Ball et al. | 372/6 |
| 5,359,612 | 10/1994 | Dennis et al. | 372/6 X |
| 5,392,153 | 2/1995 | Delavaux | 359/341 |
| 5,434,702 | 7/1995 | Byron | 359/341 |
| 5,563,732 | 10/1996 | Erdogan et al. | 359/341 |
| 5,608,571 | 3/1997 | Epworth et al. | 359/341 |

OTHER PUBLICATIONS

J.E. Midwinter et al., "Optoelectronics and Lightwave Technology", John Wiley & Sons, 1992, pp. 207–211. [No Month].

J.C. Licas et al., "High Power Erbium–Doped Fiber Amplifier Pumped at 980nm", *1995 Conference on Lasers and Electro–Optics*, Baltimore, Maryland, 1995, postdeadline proceedings, paper CDP27, 2 pp., May 1995.

J.D. Minelly et al., "High-grain fiber amplifier tandem-pumped by a 3-W multistripe diode", *Optical Fiber Communications Conference*, 1992 OSA Technical Digest Series, vol. 5 (Optical Society of America, Washington, DC, 1992) paper TuG2., pp., Feb. 1992.

H.M. Pask et al., "Ytterbium–Doped Silica Fiber Lasers: Versatile Sources for the 1–1.2 μM Region", *IEEE Journal of Selected Topics in Quantum Electronics*, vol. 1, No. 1, Apr. 1995, pp. 1–15.

G.A. Ball et al., "Design of a Single–Mode Linear–Cavity Erbium Fiber Laser Utilizing Bragg Reflectors," *Journal of Lightwave Technology*, vol. 10, No. 10, Oct. 1992, pp. 1338–1343.

Hill, et al., "Bragg gratings fabricated in monomode photosensitive optical fiber by UV exposure through a phase mask," *Applied Physics Letters*, vol. 62, No. 10, Mar. 8, 1993, pp. 1035–1037.

J.E. Midwinter et al., "Optoelectronics and Lightwave Technology", John Wiley & Sons, 1992, pp. 205–207. [No Month].

*Primary Examiner*—John D. Lee
*Attorney, Agent, or Firm*—V. D. Duraiswamy; W. K. Denson-Low

[57] ABSTRACT

A high power Er-doped fiber amplifier/laser system includes a cladding-pumped fiber grating laser that emits an output beam at a wavelength that falls within an absorption band of erbium. The fiber grating laser output beam is used as the pumping source for an Er-doped fiber amplifier or laser. Because the output from the fiber grating laser falls within one of the erbium absorption bands, the amplifier or laser may be directly pumped with the fiber grating laser's output without the need for co-doping. In a preferred embodiment, the fiber grating laser is a 980 nm ytterbium-doped fiber grating laser that is cladding-pumped with a multi-transverse mode diode laser array. The Yb-doped fiber grating laser and the Er-doped fiber amplifier/laser are preferably spliced directly to an input and output arm of a WDM fiber coupler, respectively. This allows the 980 nm output from the Yb-doped fiber grating laser to be coupled to the Er-doped fiber amplifier/laser through an all-fiber path, without having to propagate through air.

19 Claims, 2 Drawing Sheets

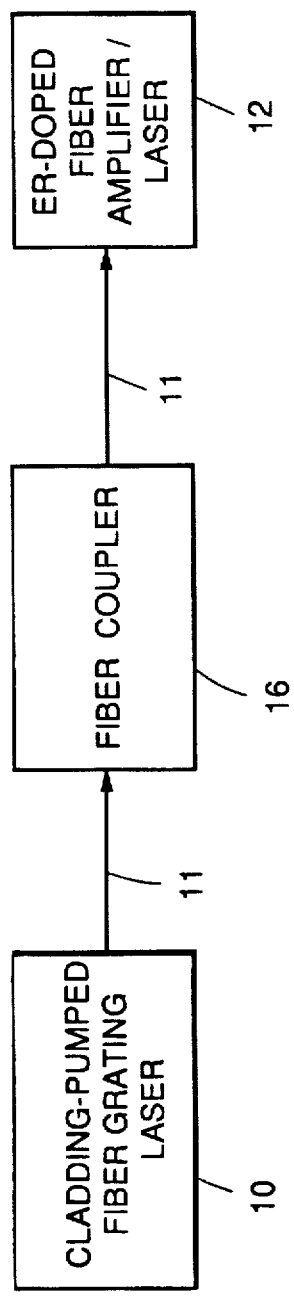
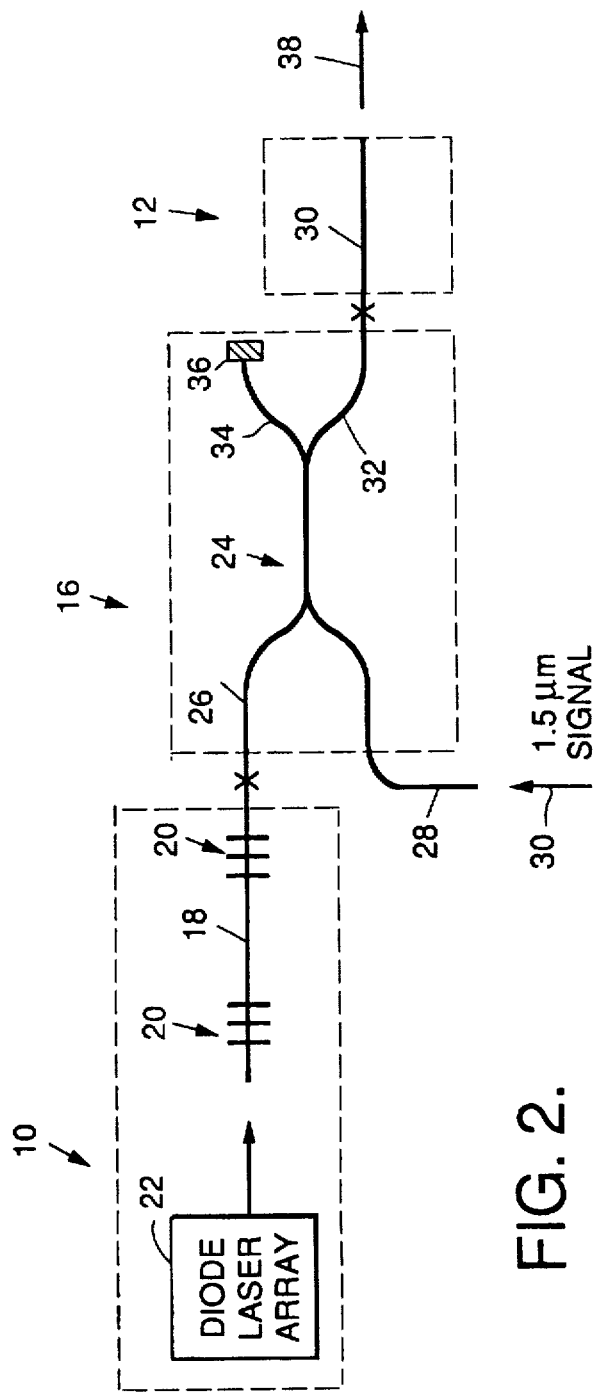

ical losses.

2. Description of the Related Art

Optically pumped fiber amplifiers and laser systems, described generally in J. E. Midwinter et al., "Optoelectronics and Lightwave Technology", John Wiley & Sons, 1992, pp. 207–211, are used extensively in fiber optic communication systems. In a typical fiber optic communications network, fiber amplifiers are used to maintain the amplitude of the signal and the integrity of the data it carries between a source and destination. As fiber networks increase in size and complexity, so does the need for higher output power fiber amplifiers and lasers.

Erbium (Er)-doped optical fibers are commonly used for fiber amplifiers and lasers because their characteristic gain bandwidth is within the third telecommunications window of 1.5 microns, which is commonly used in fiber optic communication systems. A factor affecting the gain efficiency of Er-doped fiber amplifiers and lasers is the wavelength used to optically pump the Er-doped fiber. The following pump wavelengths have been explored, and are listed in order of their representative gain efficiencies: 980 nm (4 dB/mW), 1480 nm (2.5 dB/mW), 532 nm (1.5 dB/mW), 660 nm (0.5 dB/mW) and 807 nm (0.2 dB/mW).

One prior pumping approach is to directly pump the core of the Er-doped fiber using 980 or 1480 nm diode lasers. The output (pump) beam from the diode laser must be coupled into the core of the fiber, which is a single-mode core with a diameter of approximately 5 to 10 microns. The coupling is usually accomplished with diffraction-limited optics. Because the pump beam has to be focused into the small diameter single-mode fiber, only single-transverse mode diode lasers can be used. This limits the amount of pumping power available to the relatively low (~1 Watt) output powers available out of single-mode diode lasers.

A second approach is described in J. C. Livas et al., "High Power Erbium-Doped Fiber Amplifier Pumped at 980 nm", 1995 Conference on Lasers and Electro-Optics, Baltimore, Md., 1995, postdeadline proceedings, paper CDP27. In this approach, the Er-doped fiber is pumped by a high power pump beam that is obtained by combining the outputs from multiple 980 nm master-oscillator (MOPA) lasers via polarization multiplexing. A problem with this approach is the relatively high cost and increased complexity associated with the multiplexing of multiple laser sources. In addition, diffraction-limited optics are used to couple the outputs from each MOPA laser into a wavelength division multiplexing (WDM) fiber coupler. This results in optical losses which, as was the case with the first approach, always occur to some degree when light is coupled from free space into a fiber.

A third approach is to use a cladding-pumped, neodymium (Nd)-doped fiber laser as the pump beam source for the Er-doped fiber amplifier or laser. Such a system is described in J. D. Minelly et al., "High-gain fiber amplifier tandem-pumped by a 3-W multistripe diode", *Optical Fiber Communication Conference*, 1992 OSA Technical Digest Series, Vol. 5 (Optical Society of America, Washington, D.C.,1992), paper TuG2. In this system, a laser diode array is used to cladding-pump a Nd-doped fiber laser (referred to as the "intermediate" fiber laser). The intermediate fiber laser outputs a 1.05 µm beam, which is used to pump the Er-doped fiber amplifier or laser. Because the 1.05 µm pump beam is not within one of the erbium absorption bands, the Er-doped fiber must be co-doped with ytterbium (Yb). The ytterbium ions absorb the 1.05 micron pump beam and transfer energy to the erbium ions.

An advantage of this system is that multi-mode laser diode arrays may be used to pump the intermediate fiber laser due to the cladding-pumping configuration. With cladding-pumping, the output of the diode array is used to pump the multi-mode inner cladding of the Nd-doped fiber. The inner cladding, which surrounds the Nd-doped single-mode core, couples a substantial portion of the diode array pump beam into the single-mode core. Because the diode array output does not have to be focused to a diameter small enough to couple into the single-mode core of the Nd-doped fiber, multi-transverse mode diode lasers may be used. The use of multi-transverse mode diode lasers increases the pumping power available for pumping the intermediate laser, which in turn increases the output power of the intermediate laser that is used to pump the Er/Yb co-doped fiber amplifier.

A disadvantage of this approach is that the gain efficiency of an Er/Yb co-doped fiber pumped with 1.05 µm light is smaller than that of an Er-doped fiber pumped at one of the erbium absorption lines. This is because energy transfer must occur from the ytterbium ions that absorb the 1.05 µm light to the erbium ions.

A further disadvantage is that the output coupler in the intermediate fiber laser is implemented by cleaving one of the endfaces of the Nd-doped fiber. The cleaved endface functions as a partial reflector and cannot be directly spliced to the WDM fiber coupler that is used to direct the output of the intermediate laser to the Er/Yb fiber amplifier. As a result, the output from the intermediate fiber laser is launched into the WDM fiber coupler by putting the output end of the intermediate fiber laser in close proximity to the input fiber of the fiber coupler. Alternatively, an intermediate lens is used. Both of these launching techniques result in optical losses.

SUMMARY OF THE INVENTION

In view of the above problems, the present invention provides a high power Er-doped fiber amplifier/laser system that exhibits higher gain efficiencies and lower optical losses than prior systems.

This is accomplished by utilizing a cladding-pumped fiber grating laser, that emits at a wavelength that falls within an absorption band of erbium, as the pumping source for an Er-doped fiber amplifier or laser. The cavity reflectors in the fiber laser are implemented with intra-core Bragg reflection gratings. Because the output from the fiber grating laser falls within one of the erbium absorption bands, the Er-doped fiber amplifier or laser may be directly pumped with the fiber grating laser's output without the need for co-doping.

In a preferred embodiment, the fiber grating laser is ytterbium-doped, cladding-pumped with a multi-transverse mode diode laser array and emits at a wavelength of approximately 980 nm. Because the cavity reflectors in the fiber grating laser are implemented with intra-core Bragg gratings, the output end of the laser may be directly spliced to a fiber coupler. In the preferred embodiment, the Yb-doped fiber grating laser and the Er-doped fiber amplifier/laser are preferably fusion-spliced directly to an input and output arm of a WDM fiber coupler, respectively. This allows the 980 nm output from the Yb-doped fiber grating laser to be coupled to the Er-doped fiber amplifier/laser through an all-fiber path, without having to propagate through air. This significantly reduces the system complexity and the optical losses associated with air-to-fiber coupling.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a block diagram illustrating the basic principles of the invention.

FIG. 2 is a schematic diagram illustrating a preferred embodiment of an Er-doped optical fiber amplifier built in accordance with the present invention.

DETAILED DESCRIPTION OF THE INVENTION

Figure 3:
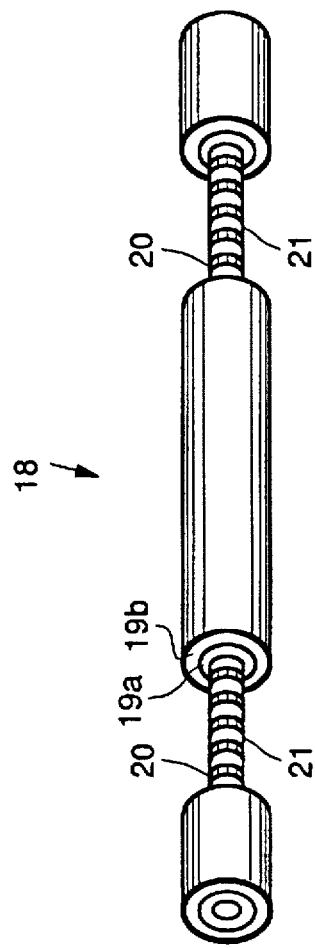
FIG. 3 is a perspective view of the Yb-doped fiber used in the embodiments of FIGS. 2 and 4.

FIG. 1 illustrates the basic principles of the invention. A cladding-pumped fiber grating laser 10, that emits an optical pump beam 11 with a wavelength that falls within an absorption band of erbium, is used as the pumping source for an Er-doped fiber amplifier/laser 12. The fiber grating laser output beam 11 is directed to the Er-doped fiber amplifier/laser 12 with a fiber coupler 16. Because the optical pump beam 11 falls within one of the erbium absorption bands, the Er-doped fiber amplifier/laser 12 does not have to be co-doped.

FIG. 2 illustrates a preferred embodiment of an Er-doped optical fiber amplifier built in accordance with the present invention. The fiber gain medium in the cladding-pumped, fiber grating laser 10 is preferably a single-mode, ytterbium-doped optical fiber 18. Ytterbium-doped silica fiber lasers are generally known and are described in H. M. Pask et al., "Ytterbium-Doped Silica Fiber Lasers: Versatile Sources for the 1–1.2 μm Region", *IEEE Journal of Selected Topics in Quantum Electronics*, Vol. 1, No. 1, April 1995, pp. 1–15.

Intra-core Bragg reflection gratings 20 are used as laser resonant cavity mirrors. Intra-core Bragg grating reflectors have been used in erbium-doped fiber lasers, as described in G. A. Ball et al., "Design of a Single-Mode Linear-Cavity Erbium Fiber Laser Utilizing Bragg Reflectors," *Journal of Lightwave Technology*, Vol. 10, No. 10, October 1992, pp. 1338–1343. The Bragg gratings 20 are formed in the Yb-doped fiber 18 in the same manner as they are formed in Er-doped fibers. The fiber 18 is doped with a dopant, preferably germanium, that makes it photosensitive to ultraviolet (UV) light. The gratings 20 are formed by UV exposure of the fiber core (not shown) following the technique described in Hill et al., "Bragg gratings fabricated in monomode photosensitive optical fiber by UV exposure through a phase mask," *Applied Physics Letters*, Vol. 62, No. 10, Mar. 8, 1993, pp. 1035–1037.

FIG. 3 is a perspective view of the Yb-doped fiber 18 with a portions of the inner and outer claddings 19a and 19b removed to illustrate the Bragg gratings 20 written in the fiber core 21. Just as the bandwidth and spacing between the mirrors in a typical laser cavity are adjusted to control the lasing wavelength, the periodicity of the gratings 20 (which determine the gratings' bandwidth) and the spacing between them are chosen so that the Yb-doped fiber laser's lasing wavelength is approximately 980 nm, which falls within one of the erbium absorption bands.

As discussed above, cladding-pumping allows one to use high power multi-transverse mode lasers as the pumping source for the Yb-doped fiber 18. In the preferred embodiment, the Yb-doped fiber 18 is cladding-pumped by a multi-transverse mode diode laser array 22, preferably an array with an output wavelength of approximately 975 nm, which is within the absorption band of ytterbium. The pump beam from the diode laser array 22 is guided by the inner cladding 19a, and lasing occurs in the fiber core 21. The use of cladding-pumping is generally known, and is described in the Pask et al. article cited above, and in U.S. Pat. No. 4,815,079 to Snitzer et al.

The output from the fiber grating laser 10 is preferably directed to the erbium-doped fiber amplifier 12 by a fiber coupler 16, which is preferably a WDM coupler with a central coupling section 24. WDM couplers are well known in the art, are described in J. E. Midwinter et al., "Optoelectronics and Lightwave Technology", John Wiley & Sons, 1992, pp. 205–207, and are available commercially from Gould Inc. of Glen Burnie, Md. Because intra-core Bragg grating reflectors 20 are used as the cavity mirrors, the ends of fiber 18 do not have to be cleaved. This allows for the Yb-doped fiber 18 to be spliced directly to an input arm 26 of the WDM coupler 16 (splices are indicated by an "X" symbol in the figures). With properly matched fibers, this significantly reduces the optical coupling losses that would otherwise be present if the output of the fiber grating laser 10 were to be launched into the WDM coupler 24 after exiting the fiber 18 and propagating through air. The other input arm 28 of the WDM coupler 16 is positioned to receive a 1.5 μm signal 30 to be amplified by the Er-doped fiber amplifier 12.

The WDM coupler 16 directs the 980 nm pump beam from the fiber grating laser 10 and the 1.5 μm signal 30 to an output arm 32, which is spliced directly to a single-mode, Er-doped fiber 30 that makes up the fiber amplifier 12. The unused coupler output arm 34 is terminated using an index-matched termination 36.

The Er-doped fiber 30 amplifies the 1.5 μm signal 30 in response to excitation from the 980 nm pump beam from the fiber grating laser 10. The amplified 1.5 μm signal 38 then exits the Er-doped fiber 30. The single-mode, Er-doped fiber is suitably AT&T EDF-HC fiber doped with erbium.

Figure 4:
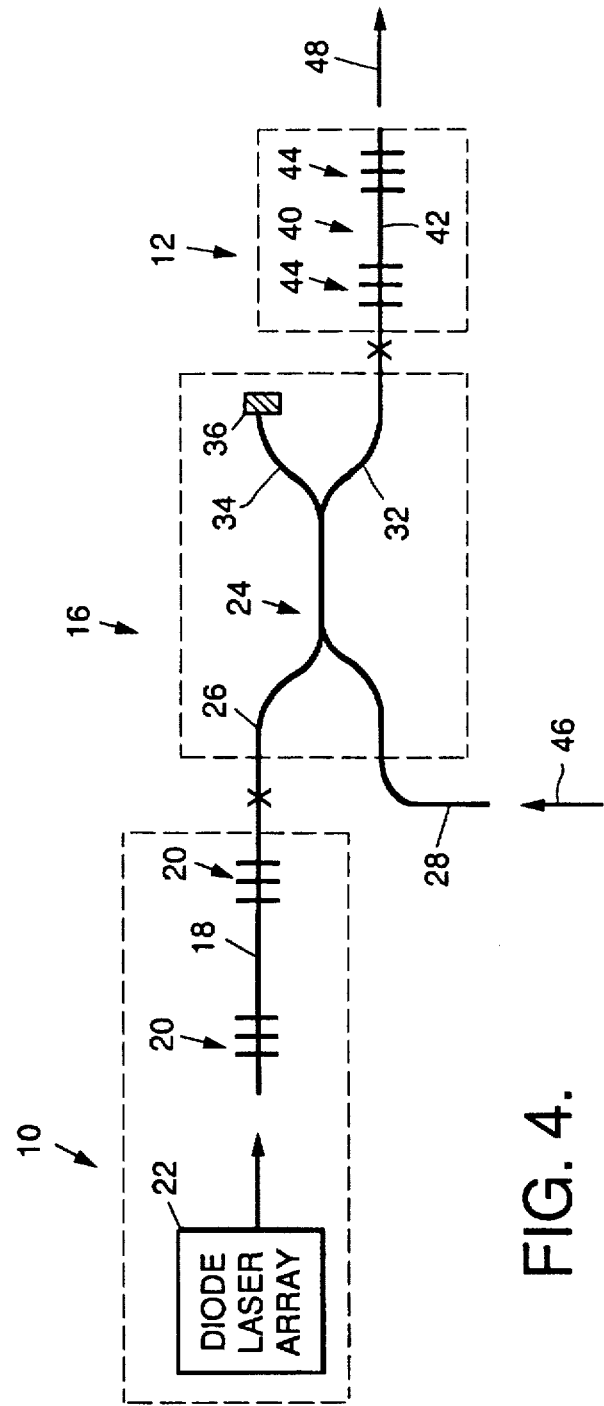
FIG. 4 is a schematic diagram illustrating a preferred embodiment of an Er-doped optical fiber laser system built in accordance with the present invention.

FIG. 4 illustrates a preferred embodiment of an Er-doped optical fiber laser system built in accordance with the present invention. The system is identical to the system of FIG. 2, except for the substitution of an Er-doped fiber laser 40 for the Er-doped fiber amplifier of FIG. 2. The Er-doped fiber laser 40 preferably comprises an Er-doped single-mode fiber 42, with intra-core Bragg grating reflectors 44 used for the cavity reflectors, so that the fiber 42 may be spliced directly to the coupler output arm 32. As discussed above, Er-doped fiber lasers with Bragg grating reflectors are generally known and are described in the Ball et al. article cited above.

As with the fiber amplifier 30 of FIG. 2, the Er-doped fiber grating laser 40 is pumped by the 980 nm output from the Yb-doped fiber grating laser 10, and produces a laser output beam 48. The Er-doped fiber grating laser 40 may be optionally seeded with a signal beam 46 launched into coupler input arm 28.

Numerous variations and alternate embodiments will occur to those skilled in the art without departing from the spirit and scope of the invention. For example, although a diode laser array was disclosed as the preferred pumping source for the Yb-doped fiber grating laser, other pumping sources that emit within ytterbium's absorption band may be used. Some examples of other pumping sources are Ti-Sapphire lasers, Nd:YLF lasers and Nd:YAG lasers. Such variations and alternate embodiments are contemplated, and can be made without departing from the spirit and scope of the appended claims.

We claim:

1. A fiber-based optical gain system, comprising:
   an erbium-doped optical fiber gain medium,
   a cladding-pumped, fiber grating laser for generating an optical pump beam, said laser comprising at least two intra-core Bragg gratings that restrict the laser's lasing wavelength to a value that falls within an absorption band of erbium,
   a fiber coupler connected to optically couple said fiber grating laser to said fiber gain medium so that said gain medium is pumped by said optical pump beam.

2. The system of claim 1, wherein said cladding-pumped, fiber grating laser comprises a single-mode, ytterbium-doped fiber grating laser that is cladding-pumped with a multi-mode diode laser array.

3. The system of claim 2, wherein said intra-core Bragg gratings restrict the fiber grating laser's lasing wavelength to approximately 980 nm.

4. The system of claim 3, wherein said erbium-doped optical fiber gain medium comprises an erbium-doped, single-mode optical fiber amplifier.

5. The system of claim 3, wherein said erbium-doped optical fiber gain medium comprises an erbium-doped, single-mode fiber laser.

6. The system of claim 5, wherein said single-mode fiber laser further comprises at least two intra-core Bragg reflection gratings.

7. The system of claim 1, wherein said cladding-pumped, fiber grating laser is pumped at one wavelength within the absorption band of erbium and generates an optical pump beam of higher frequency within the same absorption band.

8. A fiber-based optical gain system, comprising:
   a single-mode, ytterbium-doped fiber grating laser for generating an optical pump beam with a wavelength that falls within an absorption band of erbium, said laser comprising at least two intra-core Bragg gratings that control the laser's lasing wavelength,
   a wavelength division multiplexing (WDM) fiber coupler with a first input arm spliced to said laser, said coupler directing said optical pump beam to an output arm of said coupler, and
   an erbium-doped optical fiber gain medium spliced to the output arm of said fiber coupler, so that said optical pump beam is coupled into said gain medium.

9. The system of claim 8, wherein said ytterbium-doped fiber grating laser comprises:
   a single-mode, ytterbium-doped optical fiber with at least two intra-core Bragg gratings, and
   a solid-state laser positioned to cladding-pump said ytterbium-doped fiber.

10. The system of claim 9, wherein said intra-core Bragg gratings restrict the lasing wavelength of said ytterbium-doped fiber grating laser to approximately 980 nm.

11. The system of claim 10, wherein said solid-state laser comprises a multi-mode laser diode array.

12. The system of claim 10, wherein said erbium-doped optical fiber gain medium comprises a single-mode, erbium-doped optical fiber amplifier for amplifying an optical signal beam, and wherein said WDM fiber coupler further comprises a second input arm positioned to receive said optical signal beam and direct it to the output arm of said coupler, thereby coupling said optical signal beam into said erbium-doped fiber amplifier.

13. The system of claim 10, wherein said erbium-doped optical fiber gain medium comprises an erbium-doped fiber laser.

14. The system of claim 13, wherein said erbium-doped fiber laser comprises at least two intra-core Bragg reflection gratings.

15. The system of claim 8, wherein said single mode ytterbium-doped, fiber grating laser is pumped at one wavelength within the absorption band of erbium and generates an optical pump beam of higher frequency within the same absorption band.

16. An fiber-based optical gain system with an all-fiber pump-to-gain-medium coupling path, comprising:
   a fiber gain medium,
   a fiber grating laser for generating an optical pump beam with a wavelength that falls within the fiber gain medium's pump wavelength band, said fiber laser comprising at least two Bragg reflection gratings that determine the laser's lasing wavelength, and
   a wavelength division multiplexing (WDM) fiber coupler with a first input arm spliced to said fiber laser, a second input arm positioned to receive an optical signal beam, and an output arm spliced to said fiber gain medium, said WDM fiber coupler directing said optical pump beam and said signal beam from said input arms to said output arm, so that said beams are coupled into said fiber gain medium.

17. The system of claim 16, wherein said fiber gain medium comprises an optical fiber amplifier.

18. The system of claim 16, wherein said fiber gain medium comprises an optical fiber grating laser.

19. The system of claim 16, wherein said fiber grating laser is pumped at one wavelength within the absorption band of the fiber gain medium and generates an optical pump beam of higher frequency within the same absorption band.

* * * * *